United States Patent
Kato et al.

(10) Patent No.: US 11,569,708 B2
(45) Date of Patent: Jan. 31, 2023

(54) ROTARY ELECTRIC MACHINE AND WHEEL STEERING SYSTEM OF VEHICLE

(71) Applicant: AISIN CORPORATION, Kariya (JP)

(72) Inventors: Hideaki Kato, Kariya (JP); Hiroaki Yui, Kariya (JP); Shinpei Fujii, Kariya (JP)

(73) Assignee: AISIN CORPORATION, Aichi (JP)

( * ) Notice: Subject to any disclaimer, the term of this patent is extended or adjusted under 35 U.S.C. 154(b) by 38 days.

(21) Appl. No.: 17/197,578

(22) Filed: Mar. 10, 2021

(65) Prior Publication Data
US 2021/0320556 A1    Oct. 14, 2021

(30) Foreign Application Priority Data

Apr. 8, 2020   (JP) .............................. JP2020-069607

(51) Int. Cl.
| | | |
|---|---|---|
| *H02K 5/22* | (2006.01) | |
| *H02K 11/01* | (2016.01) | |
| *B62D 5/04* | (2006.01) | |
| *H02K 1/18* | (2006.01) | |
| *H02K 7/08* | (2006.01) | |

(52) U.S. Cl.
CPC ............ *H02K 5/22* (2013.01); *B62D 5/0403* (2013.01); *H02K 1/185* (2013.01); *H02K 7/083* (2013.01); *H02K 11/0141* (2020.08)

(58) Field of Classification Search
CPC ...... H02K 29/08; H02K 7/1166; H02K 7/081; H02K 11/215; H02K 7/08; H02K 7/116; H02K 1/185; H02K 5/20; H02K 5/02; H02K 5/06; H02K 5/203; H02K 9/00; H02K 5/04; B60S 1/08
See application file for complete search history.

(56) References Cited

U.S. PATENT DOCUMENTS

| | | | |
|---|---|---|---|
| 8,786,159 B2* | 7/2014 | Hattori | H02K 1/185 |
| | | | 310/216.118 |
| 10,797,561 B2* | 10/2020 | Shoda | H02K 29/08 |

(Continued)

FOREIGN PATENT DOCUMENTS

| | | | |
|---|---|---|---|
| DE | 10 2012 100 776 A1 | 8/2013 | |
| DE | 102012100776 A1 * | 8/2013 | ............... H02K 5/15 |

(Continued)

OTHER PUBLICATIONS

DE-102012100776-A1 abstract machine translation Jun. 14, 2022.*

(Continued)

*Primary Examiner* — Leda T Pham
(74) *Attorney, Agent, or Firm* — Buchanan Ingersoll & Rooney PC

(57) ABSTRACT

Provided is a rotary electric machine including a stator including a plurality of stator pieces, a rotor being arranged inside the stator and rotating about a rotation axis, a housing holding the stator and the rotor, a lid member preventing the stator and the rotor from coming out of the housing, and a cylindrical frame forming the stator by containing the plurality of stator pieces and being internally mounted in the housing, in which a first fixing portion and a second fixing portion for fixing the frame to the housing are disposed at both end portions of the frame along an extending direction of the rotation axis.

3 Claims, 1 Drawing Sheet

(56) References Cited

U.S. PATENT DOCUMENTS

2005/0116561 A1* 6/2005 Matsubara .......... B62D 5/0412
                 310/83
2007/0235248 A1 10/2007 Matsubara et al.
2014/0145548 A1  5/2014 Asao et al.

FOREIGN PATENT DOCUMENTS

| EP | 1 535 825 A2 | 6/2005 |
|---|---|---|
| JP | H09209935 A | 8/1997 |
| JP | H09308144 A | 11/1997 |
| JP | 2007331428 A | 12/2007 |
| WO | 2013/113792 A2 | 8/2013 |

OTHER PUBLICATIONS

The extended European Search Report dated Aug. 25, 2021, by the European Patent Office in corresponding European Patent Application No. 21164651.8-1201. (8 pages).

* cited by examiner

ROTARY ELECTRIC MACHINE AND WHEEL STEERING SYSTEM OF VEHICLE

CROSS REFERENCE TO RELATED APPLICATIONS

This application is based on and claims priority under 35 U.S.C. § 119 to Japanese Patent Application 2020-069607, filed on Apr. 8, 2020, the entire content of which is incorporated herein by reference.

TECHNICAL FIELD

This disclosure generally relates to a rotary electric machine configured by arranging a plurality of divided stator pieces in a cylindrical shape and thereby forming a stator, and housing the stator in a housing, and a wheel steering system of a vehicle including the rotary electric machine.

BACKGROUND DISCUSSION

Examples of a technology relating to such a rotary electric machine include a rotary electric machine described in JP9-308144A (Reference 1) (see paragraphs [0006] and [0012] and FIGS. 1 and 2).

In the rotary electric machine, an integrated stator is formed by, for example, arranging stator pieces, which are formed in a divided manner into twelve pieces, in a cylindrical shape and welding adjacent stator pieces to each other.

Each stator piece is formed by densely winding a winding around an iron core that is formed by stacking iron pieces having a predetermined shape. The twelve stator pieces, which are individually formed, are integrated by, while bringing the twelve stator pieces into contact with each other in a cylindrical shape, welding outer peripheral surfaces of adjacent stator pieces to each other.

On this occasion, the welding is performed at dispersed points. In other words, although a contact line between a pair of adjacent stator pieces is formed in a linear shape along an axis of the rotor, performing welding over the whole contact line causes the pair of adjacent stator pieces to be electrically conducted to each other, which inhibits an excellent magnetic circuit from being formed.

Thus, welding portions are disposed at dispersed points along the linear contact line. As examples of the welding portions, welding portions each of which is welded in a dot shape that extends to both stator pieces with the contact line interposed therebetween and welding portions each of which is welded in a tilted linear shape in such a way as to cross the contact line in order to securely join stator pieces on both sides of the contact line to each other are described in Reference 1. It is asserted that such configurations eliminate the above-described problem of the magnetic circuit.

However, in the above-described conventional rotary electric machine, since divided stator pieces are welded to each other, magnetic performance is certainly impaired at the welding portions.

In addition, it is difficult to completely eliminate disturbance in relative arrangements between stator pieces at the time of welding, and such disturbance leads to a reduction in the magnetic performance. Further, a welding technology for forming an appropriate welding portion is required to be used, and welding cost thus increases.

A need thus exists for a rotary electric machine which is not susceptible to the drawback mentioned above.

SUMMARY

A rotary electric machine according to this disclosure includes:

a stator including a plurality of stator pieces;
a rotor being arranged inside the stator and rotating about a rotation axis;
a housing holding the stator and the rotor;
a lid member preventing the stator and the rotor from coming out of the housing; and
a cylindrical frame forming the stator by containing the plurality of stator pieces and being internally mounted in the housing.

A first fixing portion and a second fixing portion for fixing the frame to the housing are disposed at both end portions of the frame along an extending direction of the rotation axis.

A wheel steering system of a vehicle may use the rotary electric machine according to this disclosure.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment (Outline)

Figure 1:
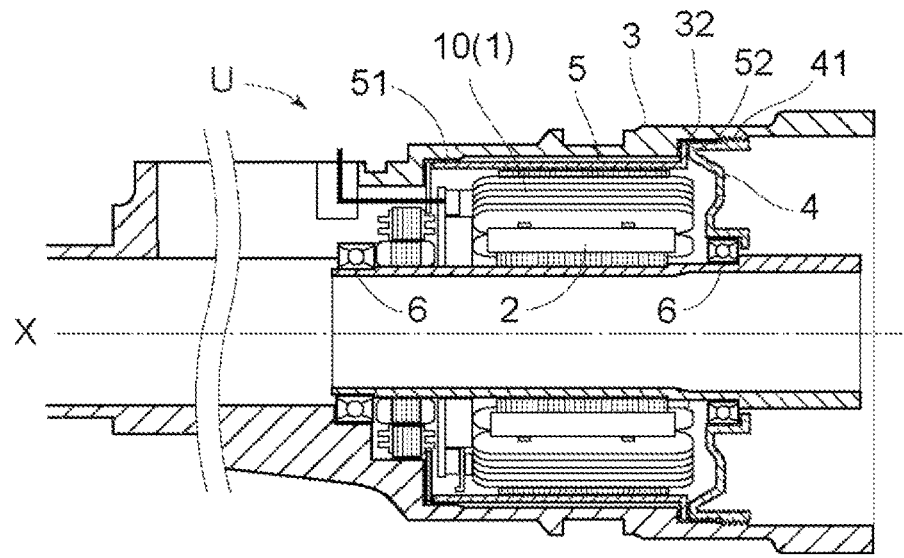
FIG. 1 is an explanatory diagram illustrating a configuration of a rotary electric machine according to this disclosure.

A rotary electric machine U of this disclosure is a rotary electric machine that is used for various types of actuators, such as a self-steering device of a vehicle. The rotary electric machine U includes, as a basic configuration, a stator 1 that includes a plurality of stator pieces 10, a rotor 2 that is arranged inside the stator 1 and rotates about a rotation axis X, a housing 3 that holds the stator 1 and the rotor 2, a lid member 4 that prevents the stator 1 and the rotor 2 from coming out of the housing 3. The rotary electric machine U, while having this basic configuration, particularly improves a fixing structure of the stator 1. A first embodiment of this disclosure will be described below with reference to FIGS. 1 to 3.

As illustrated in FIG. 1, in the rotary electric machine U according to this disclosure, the plurality of stator pieces 10 are once contained in the cylindrical frame 5 and the stator 1 is thereby formed. A first fixing portion 51 and a second fixing portion 52 are formed at both end portions of the frame 5 along the extending direction of the rotation axis X of the rotor 2, and the stator 1 is fixed to the housing 3 by use of the two fixing portions. Various types of sensors used for rotation control are mounted in advance of fixing the frame 5.

Internally mounting the plurality of stator pieces 10 in the frame 5 in advance as described above enables relative positions of the respective stator pieces 10 to be determined and the stator 1 the shape of which is stable to be formed. Since the outer surface shape of the frame 5 can be configured into, for example, a simple cylindrical surface, mounting operation of the frame 5 onto the housing 3 also becomes extremely easy.

Forming the first fixing portion 51 and the second fixing portion 52 at both end portions of the frame 5 enables a fixed state of the stator 1 to become stabler and the position of the stator 1 in the direction along the rotation axis X of the rotor 2 and the radial direction thereof to become accurate.

(First Fixing Portion of Frame)

Figure 2:
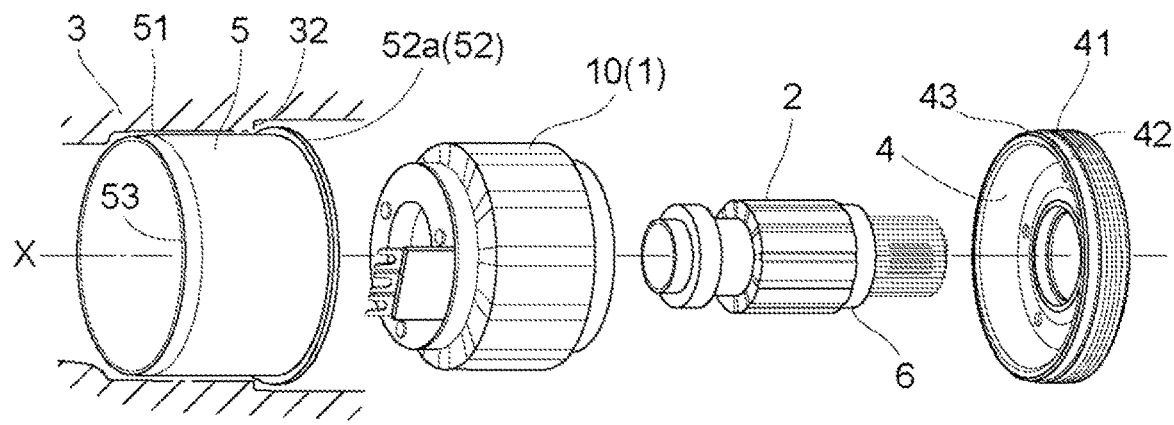
FIG. 2 is an exploded perspective view illustrating the configuration of the rotary electric machine according to this disclosure.
Figure 3:
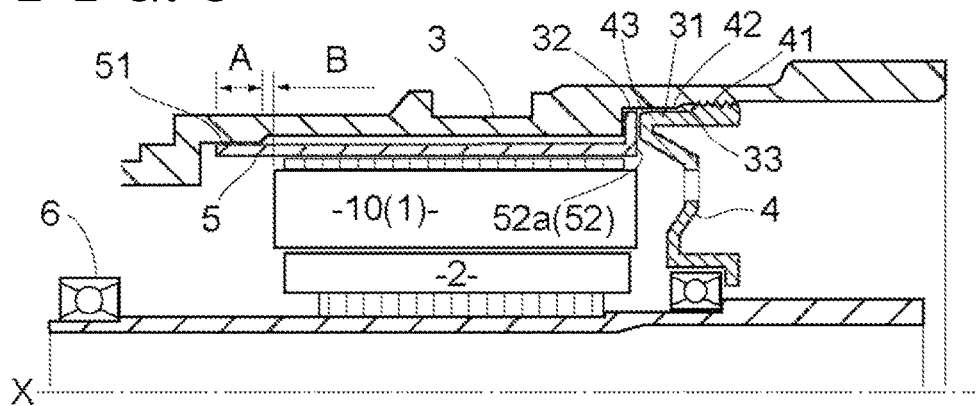
FIG. 3 is a cross-sectional view illustrating a detailed structure of a housing according to this disclosure.

The first fixing portion 51 is assumed to be the fixing portion disposed at one end portion of both end portions of the frame 5 farther than the other from the lid member 4. As illustrated in FIGS. 2 and 3, the first fixing portion 51 includes a cylindrical fitting surface that is press-fitted into the housing 3. The outer diameter of the fitting surface is configured to be the same as or slightly larger than the inner diameter of the inner surface of the housing 3. Because of this configuration, inserting the frame 5 into the housing 3 enables both portions to closely fit to each other and, in particular, the axis of the stator 1 and the rotation axis X to be coaxially aligned accurately.

When viewed orthogonally with respect to the rotation axis X, a placement region A of the first fixing portion 51 is separated from a placement region B of the stator pieces 10. In other words, it is configured such that the stator pieces 10 being arranged on the center side of the frame 5 along the rotation axis X and the first fixing portion 51 being arranged on the outer side of the arrangement region of the stator pieces 10 causes the placement region A and the placement region B to be disposed at different positions along the extending direction of the rotation axis X.

Length of the first fixing portion 51 in the direction along the rotation axis X is preferably 12% or more of the length of the stator 1 in the same direction. Specifically, when the length of the stator 1 is 30 mm, setting the length of the first fixing portion 51 to 3.6 mm or more causes the fixed state of the frame 5 to the housing 3 to become stabler.

This configuration enables diameter reduction of the frame 5 to some extent to be facilitated when the first fixing portion 51 is fittingly inserted into the inner surface of the housing 3. In addition, even when the first fixing portion 51 receives strong compressive force from the inner surface of the housing 3, the extent to which the compressive force acts on the stator pieces 10 inside the frame 5 is reduced. Thus, it is possible to make the relative positions of the respective stator pieces 10 hard to change and maintain the shape of the stator 1 in an optimum state.

This configuration enables heat reaching the respective stator pieces 10 to be suppressed to a minimum even when the first fixing portion 51 is shrink-fitted to the housing 3.

(Second Fixing Portion of Frame)

As illustrated in FIGS. 2 and 3, the second fixing portion 52 is defined to be the fixing portion disposed at one end portion of both end portions of the frame 5 closer than the other to the lid member 4. On the second fixing portion 52, a flange portion 52a that projects in the outward radial direction with respect to the rotation axis X is formed. The lid member 4 comes into contact with the flange portion 52a, which defines the position of the frame 5 in the direction along the rotation axis. For that purpose, on the inner surface of the housing 3, a step portion 32 with which the flange portion 52a pressed by the lid member 4 can come into contact is formed.

This configuration enables the flange portion 52a to be clamped by the lid member 4 and the step portion 32. Thus, the second fixing portion 52 is extremely firmly fixed to the housing 3. Disposing the flange portion 52a causes rigidity of the frame 5 to be increased and relative positions among the included stator pieces 10 to become stable. Further, since attachment operation of the lid member 4 to the housing 3 also serves as fixing operation of the frame 5, assembly operation of the rotary electric machine U becomes efficient.

(Lid Member)

As illustrated in FIG. 2, on the outer peripheral portion of the lid member 4, a threaded portion 41 to be screwed onto the housing 3 is formed. Note that it is preferable that the lid member 4 be, for example, formed into a predetermined shape through press working of a steel plate and, subsequently, the threaded portion 41 be formed on the outer peripheral surface thereof. This method enables production cost to be low.

Use of the threaded portion 41 enables a function of shielding the housing 3 and a function of fixing the frame 5 to be achieved by only the lid member 4. Thus, no separate fixing member is required and, therefore, the number of components is reduced, which enables the configuration of the rotary electric machine U to be simplified. In addition, it is not required to form a fixing site to which the lid member 4 is attached using a separate bolt or the like, which enables the rotary electric machine U to be made compact.

As illustrated in FIG. 1, the lid member 4 includes a bearing 6 for supporting the rotor 2. For that purpose, the lid member 4 is required to be arranged coaxially to the rotation axis X and to be fixed to an accurate position with respect to the housing 3. Thus, a cylindrical position determining surface 42 is formed at a position adjacent to the threaded portion 41. The position determining surface 42 faces a cylinder inner surface 31, which is formed on the inner surface of the housing 3, while in proximity thereto. Since a gap between the position determining surface 42 and the cylinder inner surface 31 is extremely small, it is preferable to form a chamfered tapered surface 33 or 43 on at least either an end portion of the cylinder inner surface 31 or an end portion of the position determining surface 42 in order to facilitate screwing the lid member 4 to the housing 3.

Disposing the position determining surface 42 enables play of the threaded portion 41, which occurs when the lid member 4 is fixed to the housing 3 by use of the threaded portion 41, to be absorbed and, at the same time, the position of the bearing 6 of the rotor 2 to be set accurately.

Length of the threaded portion 41 in the direction along the rotation axis X is preferably 24% or more of the length of the stator 1 in the same direction. Specifically, when the length of the stator 1 is 30 mm, the length of the threaded portion 41 is set to 7.2 mm or more. The threaded portion 41 is configured to be a metric thread in accordance with JIS having a nominal diameter of M94 and a pitch of 1.5 to 2 mm. This configuration causes not only the strength of the threaded portion 41 to be sufficiently strong but also the attitude of the lid member 4 to be never disturbed. Thus, it is possible to exert sufficient pressing force on the flange portion 52a, which makes the fixed state of the frame 5 to the housing 3 stabler.

As described above, fixing the frame 5 to the housing 3 through fitting by use of the first fixing portion 51 and clamping by use of the second fixing portion 52 and the lid member 4 enables the frame 5 to be fixed securely and the rotary electric machine U that extremely excels in vibration durability to be achieved.

The rotary electric machine U according to this embodiment can be used for, for example, a wheel steering system of a vehicle. The rotary electric machine U allows the total number of components to be reduced and, at the same time, the stator 1 to be placed in an appropriate state with respect to the housing 3. Therefore, the configuration of the rotary electric machine U is simplified, and reduction in size and weight thereof is facilitated. Thus, when the rotary electric machine U is used in a wheel steering system of a vehicle, it is possible to achieve a wheel steering system that excels in mountability to a vehicle and can be constructed with a low cost.

Another Embodiment

Note that the position of the frame 5 along the rotation axis X may be fixed by, instead of using the flange portion 52a, pressing an end surface 53 of the frame 5 on the side on which the first fixing portion 51 is located against a step portion (not illustrated) formed on the inner surface of the housing 3.

INDUSTRIAL APPLICABILITY

The rotary electric machine of this disclosure is widely applicable to rotary electric machines that have a stator configured by combining a plurality of stator pieces.

A rotary electric machine according to this disclosure includes:
 a stator including a plurality of stator pieces;
 a rotor being arranged inside the stator and rotating about a rotation axis;
 a housing holding the stator and the rotor;
 a lid member preventing the stator and the rotor from coming out of the housing; and
 a cylindrical frame forming the stator by containing the plurality of stator pieces and being internally mounted in the housing.

A first fixing portion and a second fixing portion for fixing the frame to the housing are disposed at both end portions of the frame along an extending direction of the rotation axis.

A configuration in which, as this configuration, the plurality of stator pieces are internally mounted in the frame in advance enables relative positions of the respective stator pieces to be fixed and the stator a shape of which is stable to be formed. Since an outer surface shape of the frame can be configured into, for example, a simple cylindrical surface, mounting operation of the frame onto the housing also becomes extremely easy.

In addition, disposing the first fixing portion and the second fixing portion and fixing both end portions of the frame to the housing by use of the fixing portions as this configuration enables a fixed state of the stator to become stabler.

In the rotary electric machine according to this disclosure, when one of the first fixing portion and the second fixing portion being located on a side farther than another from the lid member is assumed to be the first fixing portion, the first fixing portion may include a cylindrical fitting surface press-fitted into the housing, and the fitting surface may be disposed at a different position in a direction along the rotation axis with respect to the plurality of stator pieces.

A configuration in which, as this configuration, the first fixing portion formed at an end portion of the frame is pressed into the housing when the frame is fixed to the housing causes position alignment between the frame and the housing to become secure. In particular, since the portion to be pressed into the housing is a cylindrical fitting surface, it is possible to accurately set the axis of the stator with respect to the housing.

Since the fitting surface is disposed at a different position in the direction along the rotation axis with respect to the stator pieces, even when the fitting surface receives strong compressive force from the housing at a time of fixing, an extent to which the compressive force acts on the stator pieces inside the frame is reduced. Thus, it is possible to make the relative positions of the respective stator pieces hard to change and maintain the shape of the stator in an optimum state.

In the rotary electric machine according to this disclosure, when one of the first fixing portion and the second fixing portion being located on a side closer than another to the lid member is assumed to be the second fixing portion, a flange portion that projects in an outward radial direction with respect to the rotation axis and with which the lid member can come into contact may be disposed to the second fixing portion, and a step portion with which the flange portion can come into contact may be disposed on an inner surface of the housing.

Because of this configuration, the lid member pressing the flange portion of the frame and pressing the flange portion against the step portion enables the flange portion to be clamped by the lid member and the step portion. Thus, the second fixing portion is extremely firmly fixed to the housing.

In addition, disposing the flange portion causes rigidity of the frame to be increased and the relative positions among the included stator pieces to become stable.

Further, since attachment operation of the lid member to the housing also serves as fixing operation of the frame to the housing, assembly operation of the rotary electric machine becomes efficient.

In the rotary electric machine according to this disclosure, the lid member may include a threaded portion screwed to the housing.

Using the threaded portion enables the lid member itself to achieve a function of shielding the housing and a function of fixing the frame, which causes no separate fixing member to be required. Thus, the number of components is reduced, which enables the configuration of the rotary electric machine to be simplified.

In the rotary electric machine according to this disclosure, the lid member may include a bearing of the rotor and a position determining surface that is formed at a position adjacent to the threaded portion and by use of which positioning of the lid member with respect to the housing is performed.

When the lid member is fixed to the housing by use of the threaded portion, there exists some play at a screwed site of the threaded portion. Thus, there is a possibility that only simply screwing the lid member to the housing does not prevent the fixing position of the lid member from changing. Since the bearing of the rotor is disposed to the lid member of this configuration, it is required to set the rotation axis of the rotor at an appropriate position. As such, it is configured that, by disposing a position determining surface on a part of the lid member with respect to the housing, the position of the bearing can be set accurately.

A wheel steering system of a vehicle may use the rotary electric machine according to this disclosure.

The rotary electric machine having the above-described configuration allows the total number of components to be reduced and, at the same time, the stator to be placed in an appropriate state with respect to the housing. Therefore, it becomes possible to reduce a size and a weight of the rotary electric machine. Thus, when the rotary electric machine is used for a wheel steering system of a vehicle, it is possible to achieve a wheel steering system that excels in mountability to a vehicle and can be constructed with a low cost.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A rotary electric machine comprising:
a stator including a plurality of stator pieces;
a rotor being arranged inside the stator and rotating about a rotation axis;
a housing holding the stator and the rotor;
a lid member preventing the stator and the rotor from coming out of the housing; and
a cylindrical frame forming the stator by containing the plurality of stator pieces and being internally mounted in the housing, wherein
a first fixing portion and a second fixing portion for fixing the frame to the housing are disposed at both end portions of the frame along an extending direction of the rotation axis,
when one of the first fixing portion and the second fixing portion being located on a side closer than another to the lid member is assumed to be the second fixing portion,
a flange portion that projects in an outward radial direction with respect to the rotation axis and the lid member is allowed to come into contact is disposed to the second fixing portion, and
a step portion wherein the flange portion is allowed to come into contact is disposed on an inner surface of the housing,
the lid member includes a threaded portion screwed to the housing,
the lid member includes a bearing of the rotor and a position determining surface that is formed at a position adjacent to the threaded portion, the position determining surface being disposed between the threaded portion and the step portion.

2. The rotary electric machine according to claim 1, wherein,
when one of the first fixing portion and the second fixing portion being located on a side farther than another from the lid member is assumed to be the first fixing portion,
the first fixing portion includes a cylindrical fitting surface press-fitted into the housing, and
the fitting surface is disposed at a different position in a direction along the rotation axis with respect to the plurality of stator pieces.

3. A wheel steering system of a vehicle has the rotary electric machine according to claim 1.

* * * * *